(12) United States Patent
Takahashi et al.

(10) Patent No.: US 9,477,249 B2
(45) Date of Patent: Oct. 25, 2016

(54) DC-DC CONVERTER, POWER RECEIVING DEVICE, AND POWER FEEDING SYSTEM

(71) Applicant: SEMICONDUCTOR ENERGY LABORATORY CO., LTD., Atsugi-shi, Kanagawa-ken (JP)

(72) Inventors: Kei Takahashi, Kanagawa (JP); Koichiro Kamata, Kanagawa (JP); Misako Miwa, Miyagi (JP); Shuhei Maeda, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 658 days.

(21) Appl. No.: 13/711,961

(22) Filed: Dec. 12, 2012

(65) Prior Publication Data

US 2013/0154556 A1 Jun. 20, 2013

(30) Foreign Application Priority Data

Dec. 16, 2011 (JP) .................................. 2011-275190
Dec. 26, 2011 (JP) .................................. 2011-283740

(51) Int. Cl.
*H02J 7/00* (2006.01)
*G05F 3/08* (2006.01)
(Continued)

(52) U.S. Cl.
CPC . *G05F 3/08* (2013.01); *H02J 7/00* (2013.01); *H02M 3/156* (2013.01); *H02J 5/005* (2013.01); *H02J 7/025* (2013.01); *H02M 2001/0022* (2013.01)

(58) Field of Classification Search
USPC ........................................................ 320/108
See application file for complete search history.

(56) References Cited

U.S. PATENT DOCUMENTS 5,124,699 A 6/1992 Tervoert et al.
5,428,521 A 6/1995 Kigawa et al.
(Continued)

FOREIGN PATENT DOCUMENTS

EP 2320538 A 5/2011
EP 2372870 A 10/2011
(Continued)

OTHER PUBLICATIONS

Karalis. A et al. "Efficient wireless non-radiative mid-range energy transfer", Annals of Physics, vol. 323, pp. 34-48, Apr. 27, 2007.
(Continued)

*Primary Examiner* — Yalkew Fantu
(74) *Attorney, Agent, or Firm* — Nixon Peabody LLP; Jeffrey L. Costellia

(57) ABSTRACT

A circuit capable of keeping input impedance constant is provided. Further, a circuit which can contribute to improvement in power feeding efficiency in power feeding by a magnetic resonance method is provided. A voltage (a former voltage) proportional to a direct-current voltage input to a DC-DC converter from the outside and a voltage (a latter voltage) proportional to a current input from the outside are detected, and the ratio of the former voltage and the latter voltage are held constant. Accordingly, input impedance can be kept constant. Further, impedance conversion is performed in the DC-DC converter. Thus, even when the battery in which power feeding is performed exists on an output side of the DC-DC converter, input impedance can be kept constant. Consequently, power can be supplied to a power receiving device including the DC-DC converter and the battery with high power feeding efficiency by a magnetic resonance method.

16 Claims, 13 Drawing Sheets

(51) Int. Cl.
*H02M 3/156* (2006.01)
*H02J 5/00* (2016.01)
*H02J 7/02* (2016.01)
*H02M 1/00* (2006.01)

(56) References Cited

U.S. PATENT DOCUMENTS

| | | |
|---|---|---|
| 5,790,946 A | 8/1998 | Rotzoll |
| 5,932,932 A * | 8/1999 | Agatsuma et al. .......... 307/10.6 |
| 6,060,864 A * | 5/2000 | Ito ................... G01R 19/16542 320/134 |
| 6,509,217 B1 | 1/2003 | Reddy |
| 6,737,302 B2 | 5/2004 | Arao |
| 6,837,438 B1 | 1/2005 | Takasugi et al. |
| 7,180,421 B2 | 2/2007 | Pahlaven et al. |
| 7,209,771 B2 | 4/2007 | Twitchell |
| 7,301,830 B2 | 11/2007 | Takahashi et al. |
| 7,394,382 B2 | 7/2008 | Nitzan et al. |
| 7,746,143 B2 | 6/2010 | Endo |
| 8,373,386 B2 | 2/2013 | Baarman et al. |
| 8,716,974 B2 | 5/2014 | Sakoda et al. |
| 9,136,914 B2 | 9/2015 | Von Novak et al. |
| 9,190,858 B2 | 11/2015 | Baarman et al. |
| 2001/0000423 A1 * | 4/2001 | Fischer ................ H02J 7/0008 320/114 |
| 2002/0049714 A1 | 4/2002 | Yamazaki et al. |
| 2003/0017804 A1 | 1/2003 | Heinrich et al. |
| 2003/0104848 A1 | 6/2003 | Brideglall |
| 2003/0117112 A1 * | 6/2003 | Chen et al. ................... 320/137 |
| 2004/0077383 A1 | 4/2004 | Lappetelainen et al. |
| 2004/0128246 A1 | 7/2004 | Takayama et al. |
| 2004/0131897 A1 | 7/2004 | Jenson et al. |
| 2004/0145342 A1 | 7/2004 | Lyon |
| 2004/0145454 A1 | 7/2004 | Powell et al. |
| 2005/0020321 A1 | 1/2005 | Rotzoll |
| 2005/0215119 A1 | 9/2005 | Kaneko |
| 2005/0254183 A1 | 11/2005 | Ishida et al. |
| 2006/0009251 A1 | 1/2006 | Noda et al. |
| 2007/0216348 A1 | 9/2007 | Shionoiri et al. |
| 2007/0229228 A1 | 10/2007 | Yamazaki et al. |
| 2007/0229271 A1 | 10/2007 | Shionoiri et al. |
| 2007/0229279 A1 | 10/2007 | Yamazaki et al. |
| 2007/0229281 A1 | 10/2007 | Shionoiri et al. |
| 2007/0278998 A1 | 12/2007 | Koyama |
| 2007/0285246 A1 | 12/2007 | Koyama |
| 2009/0262557 A1 * | 10/2009 | Asuke ................ H02M 3/1582 363/18 |
| 2010/0097033 A1 * | 4/2010 | Tange .......................... 320/116 |
| 2010/0244577 A1 | 9/2010 | Shimokawa |
| 2010/0244580 A1 | 9/2010 | Uchida et al. |
| 2010/0259109 A1 | 10/2010 | Sato |
| 2010/0289449 A1 | 11/2010 | Elo |
| 2011/0018358 A1 | 1/2011 | Kozakai |
| 2011/0018495 A1 | 1/2011 | Komiyama |
| 2011/0080053 A1 | 4/2011 | Urano |
| 2011/0095619 A1 | 4/2011 | Urano |
| 2011/0101791 A1 | 5/2011 | Urano |
| 2011/0227421 A1 | 9/2011 | Sakoda et al. |
| 2011/0270462 A1 | 11/2011 | Amano et al. |
| 2012/0032521 A1 | 2/2012 | Inoue et al. |
| 2012/0133212 A1 | 5/2012 | Kamata |
| 2012/0139491 A1 * | 6/2012 | Eberhard et al. ............. 320/118 |

FOREIGN PATENT DOCUMENTS

| | | |
|---|---|---|
| EP | 2421121 A | 2/2012 |
| JP | 07-250477 A | 9/1995 |
| JP | 2000-050496 A | 2/2000 |
| JP | 2002-101578 A | 4/2002 |
| JP | 2002-252971 A | 9/2002 |
| JP | 2005-160224 A | 6/2005 |
| JP | 2006-180073 A | 7/2006 |
| JP | 2010-119246 A | 5/2010 |
| JP | 2010-130878 A | 6/2010 |
| JP | 2010-193598 A | 9/2010 |
| JP | 2010-220338 A | 9/2010 |
| JP | 2010-239690 A | 10/2010 |
| JP | 2010-239769 A | 10/2010 |
| JP | 2010-252446 A | 11/2010 |
| JP | 2010-252468 A | 11/2010 |
| JP | 2011-120443 A | 6/2011 |
| JP | 2012-060730 A | 3/2012 |
| JP | 2012-060731 A | 3/2012 |
| TW | 200841148 | 10/2008 |
| TW | 201042874 | 12/2010 |
| TW | 201128986 | 8/2011 |
| WO | WO-2010/055381 | 5/2010 |
| WO | WO-2010/064584 | 6/2010 |
| WO | WO-2010/080736 | 7/2010 |
| WO | WO-2010/085703 | 7/2010 |
| WO | WO-2010/119577 | 10/2010 |
| WO | WO-2012/070634 | 5/2012 |

OTHER PUBLICATIONS

Kurs.A et al., "Wireless Power Transfer via Strongly Coupled Magnetic Resonances,", Science, Jul. 6, 2007, vol. 317, No. 5834, pp. 83-86.

Mitamoto.T et al., "Wireless Power Transfer System with a Simple Receiver Coil,", IMWS 2011 (2011 IEEE MTT-S International Microwave Workshop Series), May 12, 2011, pp. 131-134.

'International Search Report (Application No. PCT/JP2011/077109; PCT14318) Dated Feb. 21, 2012.

'Written Opinion (Application No. PCT/JP2011/077109; PCT14318) Dated Feb. 21, 2012.

Taiwanese Office Action (Application No. 101145978) Dated Apr. 26, 2016.

* cited by examiner

FIG. 9A
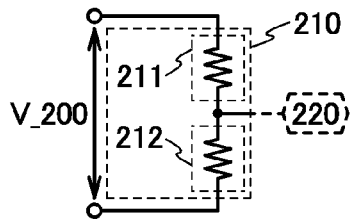
FIG. 9B
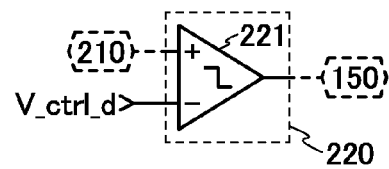
FIG. 9C
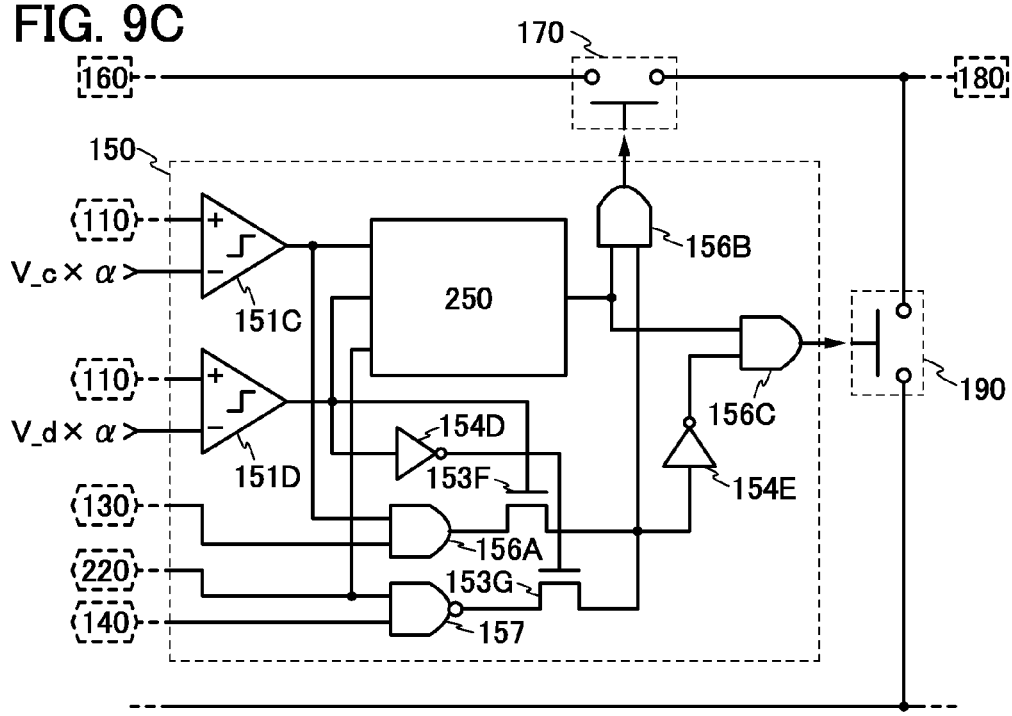
FIG. 9D
| | V_151C | V_151D | V_220 | V_250 |
|---|---|---|---|---|
| 1-1 | L | L | L | L |
| 1-2 | L | H | L | L |
| 1-3 | H | H | L | H |
| 2-1 | L | L | H | H |
| 2-2 | L | H | H | L |
| 2-3 | H | H | H | H |
FIG. 9E
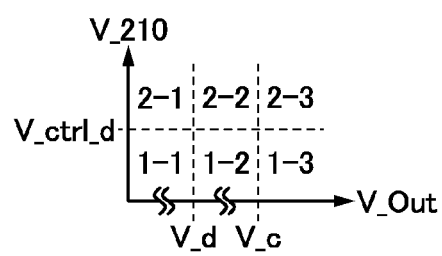
FIG. 9F
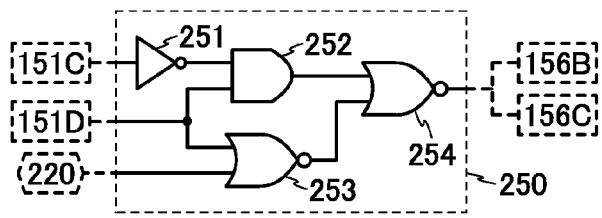

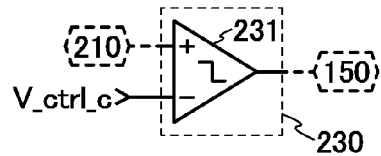
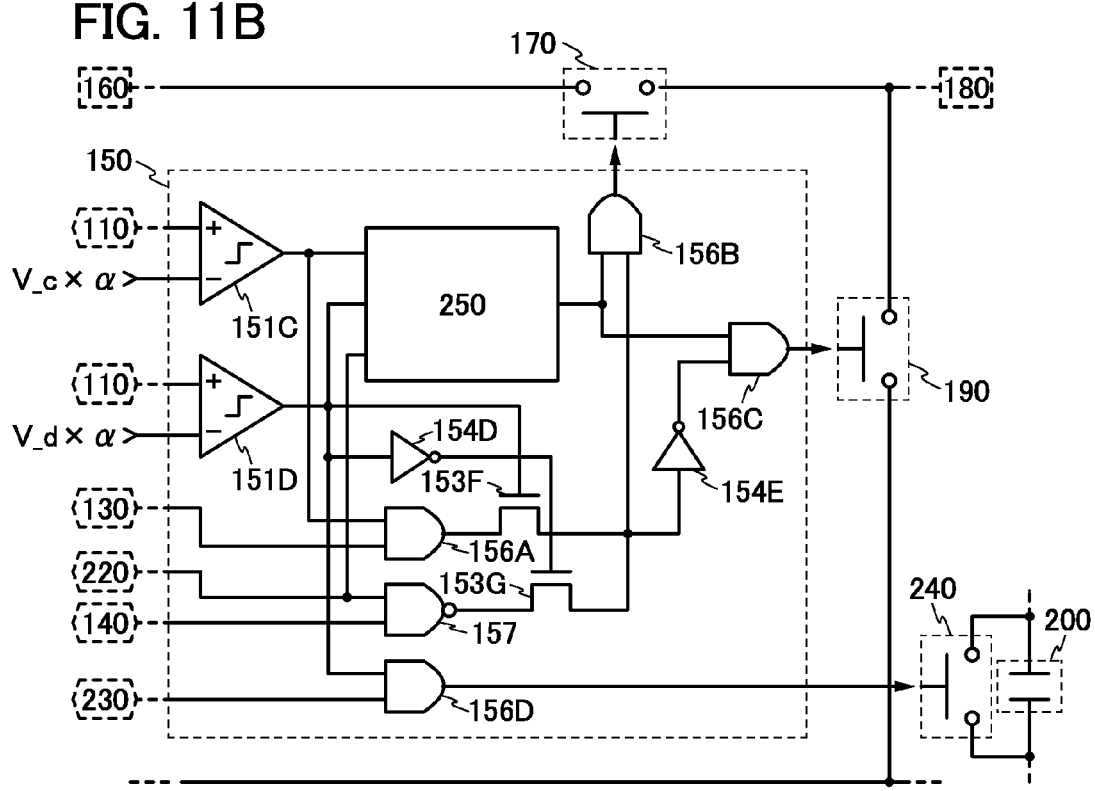

DC-DC CONVERTER, POWER RECEIVING DEVICE, AND POWER FEEDING SYSTEM

BACKGROUND OF THE INVENTION

1. Field of the Invention

The present invention relates to a DC-DC converter. Specifically, the present invention relates to a DC-DC converter capable of keeping input impedance constant. Further, the present invention relates to a power receiving device including the DC-DC converter. Furthermore, the present invention relates to a power feeding system including the power receiving device.

2. Description of the Related Art

A method called a magnetic resonance method is attracting attention as a method for feeding power to an object (hereinafter, also referred to as a power receiving device) in a state where contact with a power supply source (hereinafter, also referred to as a power transmitting device) is not made (such a method is also referred to as contactless power feeding, wireless feeding, or the like). The magnetic resonance method is a method for forming an energy propagation path by providing resonator coupling between resonance coils each of which is provided in a power transmitting device and a power receiving device. The magnetic resonance method has a longer power transmittable distance than other methods capable of contactless power feeding (e.g., an electromagnetic induction method and an electrostatic induction method). For example, Non-Patent Document 1 discloses that in the magnetic resonance method, transmission efficiency is approximately 90% when the distance between a pair of resonance coils is 1 m and that the transmission efficiency is approximately 45% when the distance between the pair of resonance coils is 2 m.

REFERENCE

Non-Patent Document

Non-Patent Document 1: Andre Kurs et al., "Wireless Power Transfer via Strongly Coupled Magnetic Resonances", *Science*, Vol. 317, pp. 83-86, 2007.

SUMMARY OF THE INVENTION

Power feeding by a magnetic resonance method is generally performed for the purpose of charging a battery provided for a power receiving device. Here, input impedance of the power receiving device can change depending on the charge condition of the battery. That is, the input impedance of the power receiving device can change dynamically during the power feeding. In that case, when output impedance of a power transmitting device is constant, an impedance mismatch is inevitably caused. Thus, in the power feeding by a magnetic resonance method, it may be difficult to maintain power feeding efficiency at a high level during the power feeding.

In view of the above, an object of one embodiment of the present invention is to provide a circuit capable of keeping input impedance constant. Further, another object is to provide a circuit which can contribute to improvement in power feeding efficiency in power feeding by a magnetic resonance method.

One embodiment of the present invention is to detect a voltage (a former voltage) proportional to a direct-current voltage input from the outside and a voltage (a latter voltage) proportional to a current input from the outside and to hold a ratio of the former voltage and the latter voltage constant on the basis thereof.

Specifically, one embodiment of the present invention is a DC-DC converter including an input power detection unit to which a first direct-current voltage is input, and a voltage conversion unit which converts the first direct-current voltage to a second direct-current voltage and outputs the second direct-current voltage. The input power detection unit includes a load, a first means which detects a first voltage proportional to the first direct-current voltage, and a second means which detects a second voltage proportional to a current generated in the load. The voltage conversion unit includes a switch which controls a current generated in the load, and a third means which holds a ratio of the first voltage and the second voltage constant by controlling switching of the switch in accordance with the first voltage and the second voltage.

In the DC-DC converter according to one embodiment of the present invention, the ratio of the first voltage proportional to an input voltage (the first direct-current voltage) and the second voltage proportional to an input current (the current generated in the load) is held constant, whereby input impedance can be kept constant. Further, impedance conversion can be performed in the DC-DC converter. Thus, in the case where a battery to which power is supplied exists on an output side of the DC-DC converter, input impedance of the DC-DC converter can be kept constant regardless of the charging state of the battery. Accordingly, when power is supplied to a power receiving device including the DC-DC converter and the battery by a magnetic resonance method, power feeding efficiency can be kept high during the power feeding.

BRIEF DESCRIPTION OF THE DRAWINGS

FIG. 9A illustrates a specific example of a means 210, FIG. 9B illustrates a specific example of a means 220, FIG. 9C illustrates a specific example of the means 150, FIGS. 9D and 9E each illustrate an output of an operation selection circuit, and FIG. 9F illustrates a specific example of the operation selection circuit.

FIG. 11A illustrates a specific example of a means 230 and FIG. 11B illustrates a specific example of the means 150.

DETAILED DESCRIPTION OF THE INVENTION

Embodiments of the present invention will be described below in detail. Note that the present invention is not limited to the description below, and a variety of changes can be made without departing from the spirit and scope of the present invention. Therefore, the invention should not be construed as being limited to the description below.

In this specification, the terms "higher than or equal to", "higher than", "lower than or equal to", and "lower than" are used when the range of values are specified. The term "higher than or equal to" can be replaced with "higher than", and "lower than or equal to" can be replaced with "lower than". For example, in this specification, the description of "higher than or equal to A and lower than B" can be replaced with "higher than A and lower than or equal to B"

⟨DC-DC Converter⟩

First, a DC-DC converter is described with reference to FIGS. 1A to 1D, FIGS. 2A to 2D, FIGS. 3A to 3C, FIG. 4, FIG. 5, FIGS. 6A and 6B, FIGS. 7A to 7E, FIGS. 8A and 8B, FIGS. 9A to 9F, FIGS. 10A and 10B, and FIGS. 11A and 11B.

⟨1. Configuration Example 1 of DC-DC Converter⟩

Figure 1A:
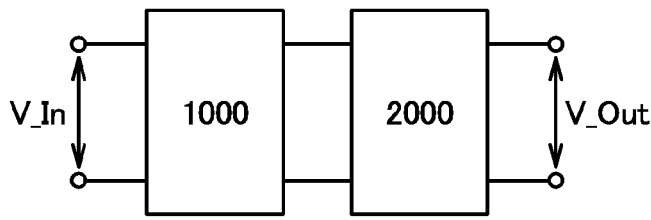
FIG. 1A illustrates a configuration example of a DC-DC converter, FIGS. 1B and 1C each illustrate a configuration example of an input power detection unit.

FIG. 1A illustrates a configuration example of a DC-DC converter according to one embodiment of the present invention. The DC-DC converter in FIG. 1A includes an input power detection unit 1000 to which a direct-current voltage (V_In) is input and a voltage conversion unit 2000 that converts the direct-current voltage (V_In) into a direct-current voltage (V_Out) and outputs the direct-current voltage (V_Out).

Figure 1B:
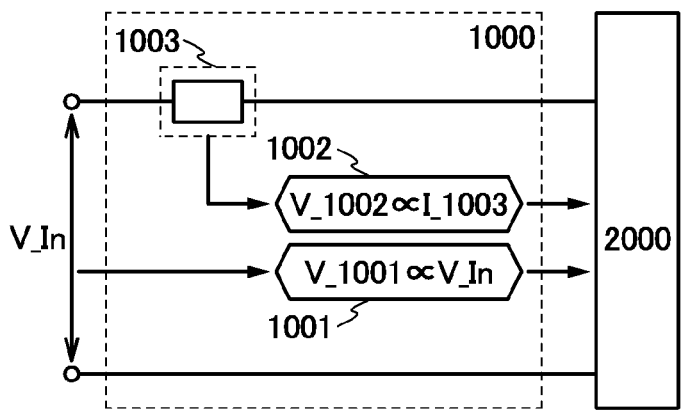
FIG. 1D illustrates a configuration example of a voltage conversion unit.
Figure 1C:
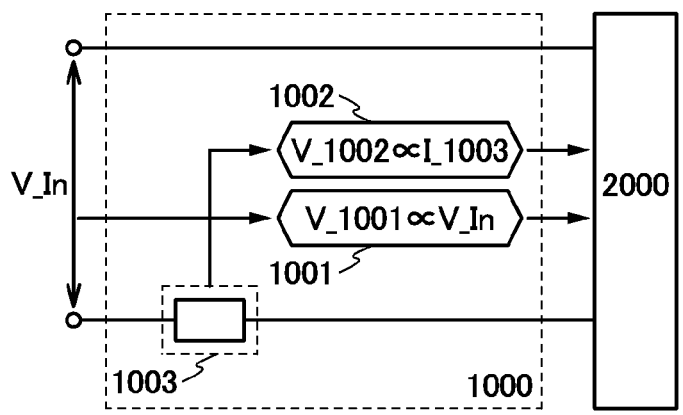

FIGS. 1B and 1C each illustrate a configuration example of the input power detection unit 1000 in FIG. 1A. The input power detection unit 1000 illustrated in FIG. 1B includes a load 1003 whose one end is electrically connected to a high-potential-side input node and whose the other end is electrically connected to the voltage conversion unit 2000, a means 1001 that detects a voltage (V_1001) proportional to the direct-current voltage (V_In), and a means 1002 that detects a voltage (V_1002) proportional to a current (I_1003) generated in the load 1003. Note that the voltage (V_1001) detected by the means 1001 and the voltage (V_1002) detected by the means 1002 are input to the voltage conversion unit 2000. Note that the input power detection unit 1000 illustrated in FIG. 1C has the same configuration as the input power detection unit 1000 illustrated in FIG. 1B except that one end of the load 1003 is electrically connected to a low-potential-side input node. In one embodiment of the present invention, as illustrated in FIGS. 1B and 1C, the load 1003 included in the input power detection unit 1000 is provided so as to be electrically connected to either the high-potential-side input node or the low-potential-side input node.

Figure 1D:
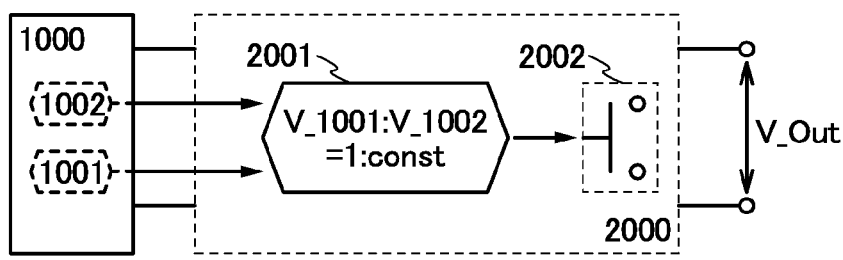

FIG. 1D illustrates a configuration example of the voltage conversion unit 2000 in FIG. 1A. The voltage conversion unit 2000 in FIG. 1D includes a switch 2002 that controls a current generated in the load 1003 by switching and a means 2001 that controls the switching of the switch 2002 in accordance with the voltage (V_1001) and the voltage (V_1002).

Note that as the voltage conversion unit 2000 illustrated in FIG. 1D, a circuit including the means 2001 and a voltage conversion circuit such as a step-up converter, a flyback converter, or an inverting converter is used, and a switch included in the voltage conversion circuit is applicable to the switch 2002.

In the DC-DC converter illustrated in FIG. 1A, even in the case where an input voltage (an input direct-current voltage (V_In)) varies, input impedance can be kept constant by the control of an input current (the current (I_1003) generated in the load 1003). Specifically, in the DC-DC converter illustrated in FIGS. 1A to 1D, the current (I_1003) generated in the load 1003 can be controlled by the switching of the switch 2002. Further the switching of the switch 2002 is controlled by the means 2001. Here, the means 2001 controls the switching of the switch 2002 in accordance with the voltage (V_1001) detected by the means 1001 and the voltage (V_1002) detected by the means 1002. That is, the means 2001 controls the switching of the switch 2002 in accordance with the voltage (V_1001) proportional to the input voltage and the voltage (V_1002) proportional to the input current. Thus, in the DC-DC converter illustrated in FIGS. 1A to 1D, input impedance can be kept constant by such a design that the ratio of the voltage (V_1001) and the voltage (V_1002) is held constant by the switching of the switch 2002 controlled by the means 2001.

⟨1-1. Example of DC-DC Converter⟩

Figure 2A:
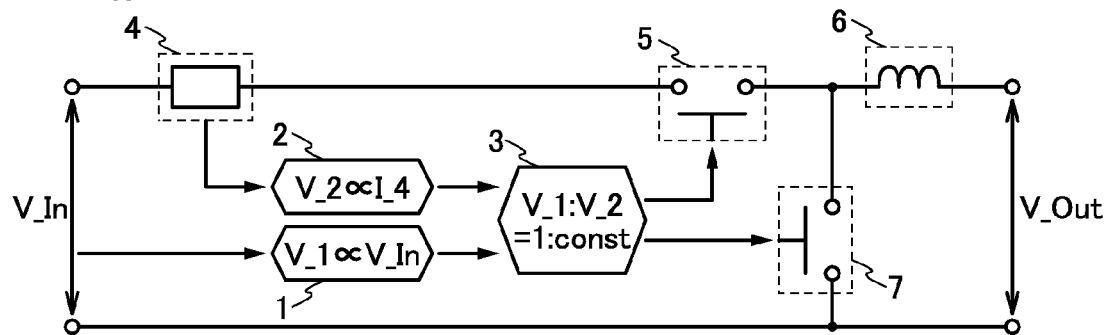
FIG. 2A illustrates an example of a DC-DC converter.

FIG. 2A illustrates an example of a DC-DC converter according to one embodiment of the present invention. The DC-DC converter illustrated in FIG. 2A includes a load 4 whose one end is electrically connected to a high-potential-side input node, a switch 5 whose one end is electrically connected to the other end of the load 4, an inductor 6 whose one end is connected to the other end of the switch 5 and whose the other end is electrically connected to a high-potential-side output node, and a switch 7 whose one end is electrically connected to the other end of the switch 5 and the one end of the inductor 6 and whose the other end is electrically connected to a low-potential-side input node and a low-potential-side output node (hereinafter this state is also referred to as "grounded"). Note that a resistance load, an inductive load, or the like can be used as the load 4. Further, a transistor, a relay, or the like can be used as the switch 5 and the switch 7. Further, an air core coil, a core coil, or the like can be used as the inductor 6.

Further, the DC-DC converter illustrated in FIG. 2A includes a means 1 which detects a voltage (V_1) proportional to an input direct-current voltage (V_In), a means 2 which detects a voltage (V_2) proportional to a current (I_4) generated in the load 4, and a means 3 which holds the ratio of the voltage (V_1) and the voltage (V_2) constant by controlling switching of the switch 5 in accordance with the voltage (V_1) and the voltage (V_2), turns off the switch 7 in a period when the switch 5 is turned on, and turns on the switch 7 in a period when the switch 5 is turned off.

In the DC-DC converter illustrated in FIG. 2A, the current (I_4) generated in the load 4 becomes zero in the period when the switch 5 is turned off; then, the current (I_4)

generated in the load 4 increases with time in the period following the change of the switch 5 from the off state to the on state. This is due to self-induction of the inductor 6, and an average value of the current (I_4) that is generated in the load 4 and increases with time converges at a constant value. Thus, in the DC-DC converter illustrated in FIG. 2A, the amount of current to be output can be controlled by the switching of the switch 5.

In the DC-DC converter illustrated in FIG. 2A, the switching of the switch 5 by the means 3 is controlled in accordance with the voltage (V_1) detected by the means 1 and the voltage (V_2) detected by the means 2. Here, the means 1 is a means which detects a voltage proportional to an input voltage (voltage at an input node) and the means 2 is a means which detects a voltage proportional to an input current (current generated in the load 4). Thus, the means 3 controls the switching of the switch 5 so as to hold the ratio of the voltage (V_1) and the voltage (V_2) constant, so that input impedance of the DC-DC converter illustrated in FIG. 2A can be kept constant.

In the DC-DC converter illustrated in FIG. 2A, the switch 7 is provided so as to prevent a breakdown of the switch 5. Specifically, in the case where the switch 5 changes from an on state to an off state, current continuously flows through the inductor 6 due to self-induction of the inductor 6. If the switch 7 is not provided, a sharp rise or drop in the potential of the node to which the other end of the switch 5 and the one end of the inductor 6 are electrically connected may occur when the switch 5 changes from an on state to an off state. Thus, in that case, a high voltage is applied to the switch 5. As a result, the switch 5 may be broken down. On the other hand, in the DC-DC converter illustrated in FIG. 2A, a current path generated in the inductor 6 can be secured by the switch 7 turned on. That is, the breakdown of the switch 5 can be prevented.

⟨ (1) Specific Example of Means 1⟩

Figure 2B:
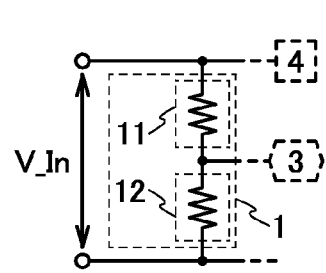
FIG. 2B illustrates a specific example of a means 1.

As the means 1, a circuit illustrated in FIG. 2B can be used. The circuit illustrated in FIG. 2B includes a resistor 11 whose one end is electrically connected to the high-potential-side input node and a resistor 12 whose one end is electrically connected to the other end of the resistor 11 and whose the other end is grounded. Further, the potential of a node where the other end of the resistor 11 and the one end of the resistor 12 are electrically connected to each other is input to the means 3. That is, the circuit illustrated in FIG. 2B is a circuit which detects the voltage (V_1) proportional to the input voltage (V_In) utilizing resistance voltage division and outputs the voltage (V_1) to the means 3.

⟨ (2) Specific Example of Means 2⟩

Figure 2C:
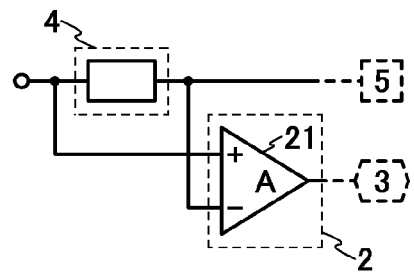
FIG. 2C illustrates a specific example of a means 2.

The circuit illustrated in FIG. 2C can be used as the means 2. The circuit illustrated in FIG. 2C includes an instrumentation amplifier 21 to which a voltage of the one end of the load 4 is input as a non-inverting input signal and a voltage of the other end of the load 4 is input as an inverting input signal. The instrumentation amplifier 21 outputs to the means 3 a voltage proportional to a difference between the voltage input to a non-inverting input terminal and the voltage input to an inverting input terminal. That is, the instrumentation amplifier 21 outputs to the means 3 a voltage proportional to the voltage applied between both ends of the load 4. Note that since the voltage applied between the both ends of the load 4 is proportional to the current (I_4) generated in the load 4, it can also be said that the instrumentation amplifier 21 outputs the current (I_4) generated in the load 4 to the means 3. That is, in the circuit illustrated in FIG. 2C, the instrumentation amplifier 21 detects the voltage (V_2) proportional to the current (I_4) generated in the load 4 and outputs the voltage (V_2) to the means 3.

⟨ (3) Specific Example of Means 3⟩

Figure 2D:
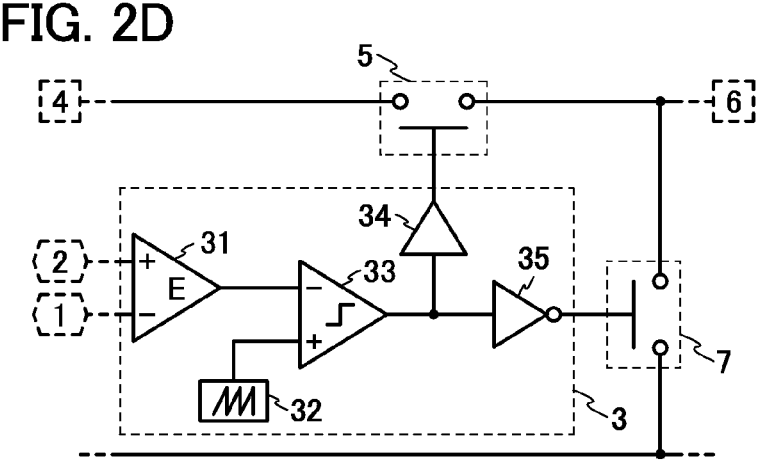
FIG. 2D illustrates a specific example of a means 3.

The circuit illustrated in FIG. 2D can be used as the means 3. The circuit illustrated in FIG. 2D includes an error amplifier 31 to which the voltage (V_2) detected by the means 2 and the voltage (V_1) detected by the means 1 are input as a non-inverting input signal and an inverting input signal, respectively; a triangle wave oscillator 32; a comparator 33 to which a voltage (triangle wave) output from the triangle wave oscillator 32 and a voltage output from the error amplifier 31 are input as a non-inverting input signal and an inverting input signal, respectively; a buffer 34 to which a voltage output from the comparator 33 is input and which controls the switching of the switch 5 by outputting a voltage which has the same phase as that of the voltage output from the comparator 33; and an inverter 35 which controls switching of the switch 7 by outputting a voltage that has a phase opposite to that of the voltage output from the comparator 33. Note that a configuration in which the switching of the switch 5 is directly controlled by the voltage output from the comparator 33 (a configuration in which the buffer 34 is omitted from the means 3 in FIG. 2D) can also be employed.

The error amplifier 31 amplifies a difference between the voltage input to the non-inverting input terminal and the voltage input to the inverting input terminal and outputs the amplified difference. That is, the error amplifier 31 amplifies the difference between the voltage (V_2) and the voltage (V_1) and outputs the amplified difference.

The comparator 33 compares the voltage input to the non-inverting input terminal and the voltage input to the inverting input terminal, and outputs a binary voltage. Specifically, a voltage at a high level is output in a period where the voltage output from the error amplifier 31 is lower than the triangle wave, and a voltage at a low level is output in a period where the voltage output from the error amplifier 31 is higher than the triangle wave. That is, the lower the voltage output from the error amplifier 31 is, the higher the duty cycle of the output signal of the comparator 33 becomes. The amount of current output from the DC-DC converter is determined in accordance with the duty cycle. Specifically, the higher the duty cycle is, the larger the current (the current (I_4) generated in the load 4) output from the DC-DC converter becomes. That is, the lower the voltage output from the error amplifier 31 is, the larger the current (I_4) generated in the load 4 becomes.

Here, the voltage output from the error amplifier 31 changes in accordance with the voltage (V_1) that is detected by the means 1 and is proportional to the input voltage (V_In) and the voltage (V_2) that is detected by the means 2 and is proportional to the current (I_4) generated in the load 4. For example, when the input voltage (V_In) becomes higher, the voltage output from the error amplifier 31 is lowered. In other words, when the input voltage (V_In) becomes higher, the duty cycle of the output signal of the comparator 33 becomes higher. Accordingly, in the circuit illustrated in FIG. 2D, the duty cycle of the output signal of the comparator 33 becomes high when the input voltage (V_In) becomes high; thus, the current (I_4) generated in the load 4 also becomes large. In short, in the circuit illustrated in FIG. 2D, the value of the current (I_4) generated in the load 4 can be changed in accordance with the variation in the value of the input voltage (V_In). Thus, in the circuit illustrated in FIG. 2D, by adjusting the design condition, the ratio of the voltage (V_1) that is detected by the means 1 and is proportional to the input voltage and the voltage (V_2) that is detected by the means 2 and is proportional to the current (I_4) generated in the load 4 can be held constant.

⟨1-2. Modification Example of DC-DC Converter⟩

Figure 3A:
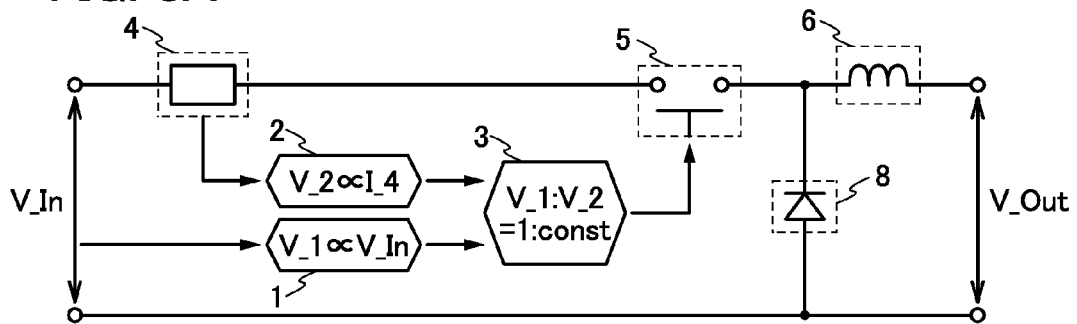
FIGS. 3A and 3C each illustrate a modification example of a DC-DC converter and FIG. 3B illustrates a specific example of the means 3.
Figure 3B:
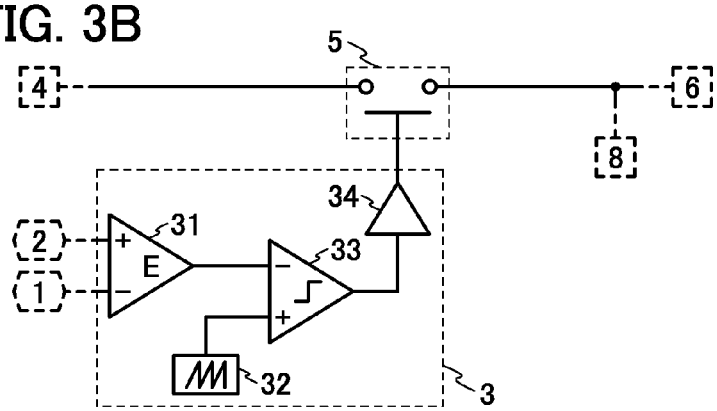

FIG. 3A illustrates an example of a DC-DC converter according to one embodiment of the present invention, which is different from the DC-DC converter illustrated in FIG. 2A. In short, the DC-DC converter illustrated in FIG. 3A has a configuration in which the switch 7 of the DC-DC converter illustrated in FIG. 2A is replaced with a diode 8. The DC-DC converter illustrated in FIG. 3A has the same function and effect as those in FIG. 2A.

Note that in the DC-DC converter illustrated in FIG. 3A, the circuit illustrated in FIG. 2B can be used as the means 1, and the circuit illustrated in FIG. 2C can be used as the means 2. Further, the circuit illustrated in FIG. 3B can be used as the means 3. In short, the circuit illustrated in FIG. 3B has a configuration in which the inverter 35 is omitted from the circuit illustrated in FIG. 2D.

Figure 3C:
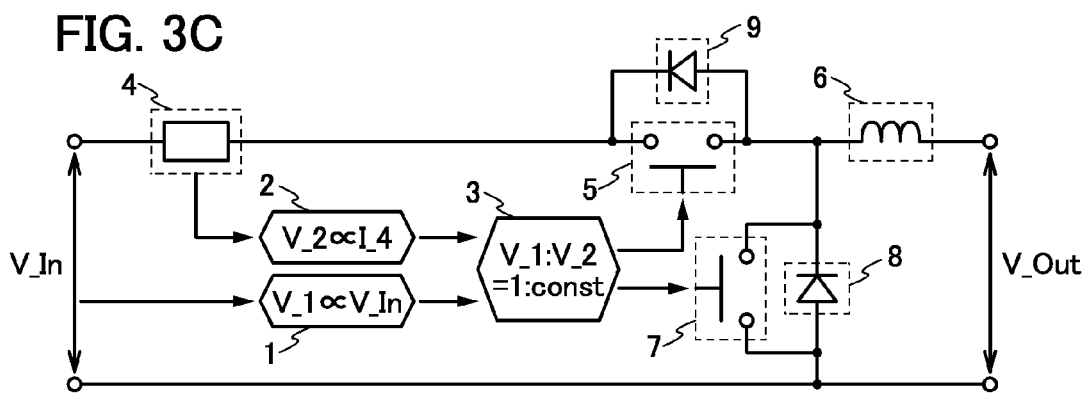

Further, as illustrated in FIG. 3C, a DC-DC converter in which the diode 8 illustrated in FIG. 3A and a diode 9 whose anode is electrically connected to the other end of the switch 5, the one end of the inductor 6, the one end of the switch 7, and a cathode of the diode 8, and whose cathode is electrically connected to the other end of the load 4 and the one end of the switch 5 are added to the DC-DC converter illustrated in FIG. 2A may be used as the DC-DC converter according to one embodiment of the present invention. Accordingly, an effect of suppressing breakdown of the switch 5 can be enhanced.

Further, a DC-DC converter in which only the diode 8 is omitted from the DC-DC converter illustrated in FIG. 3C may be used as the DC-DC converter according to one embodiment of the present invention; alternatively, a DC-DC converter in which only the diode 9 is omitted from the DC-DC converter illustrated in FIG. 3C may be used as the DC-DC converter according to one embodiment of the present invention.

⟨2. Configuration Example 2 of DC-DC Converter⟩

Figure 4:
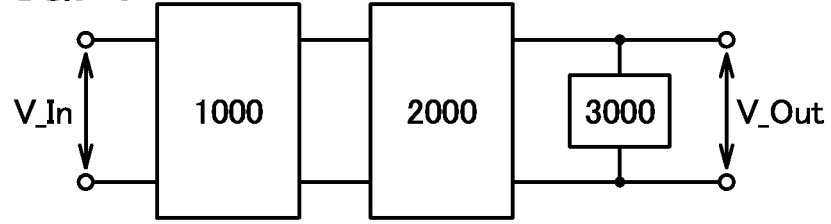
FIG. 4 illustrates a configuration example of a DC-DC converter.

FIG. 4 illustrates a configuration example of a DC-DC converter according to one embodiment of the present invention, which is different from the DC-DC converter illustrated in FIG. 1A. In short, the DC-DC converter illustrated in FIG. 4 has a configuration in which a charge and discharge unit 3000 capable of being charged from an output-side node and discharged to the output-side node in accordance with an output voltage (V_Out) is added to the DC-DC converter illustrated in FIG. 1A. As the charge and discharge unit 3000, a circuit in which charging is performed when an output voltage (V_Out) exceeds a charge inception voltage, discharging is performed when the output voltage (V_Out) is lower than a discharge inception voltage, and charging and discharging are not performed when the output voltage (V_Out) is higher than or equal to the discharge inception voltage and lower than or equal to the charge inception voltage, can be used. For example, as such a circuit, a circuit including a capacitor in which electric charge is accumulated in the charging and electric charge is released in the discharging can be used.

In the DC-DC converter illustrated in FIG. 4, the circuit illustrated in FIG. 1B or 1C can be used as the input power detection unit 1000, and the circuit illustrated in FIG. 1D can be used as the voltage conversion unit 2000.

In the DC-DC converter illustrated in FIG. 4, input impedance can be kept constant as in the case of the DC-DC converter illustrated in FIG. 1A. Further, in the DC-DC converter illustrated in FIG. 4, the charge and discharge unit 3000 is provided; thus, the value of the output voltage (V_Out) can be kept in a given range. For example, in the case where input power sharply increases, the output voltage (V_Out) can be set so as not to reach or exceed a specific value. Thus, a breakdown of a circuit of a subsequent stage to which the output voltage of the DC-DC converter is input can be suppressed.

⟨2-1. Example of DC-DC Converter⟩

Figure 5:
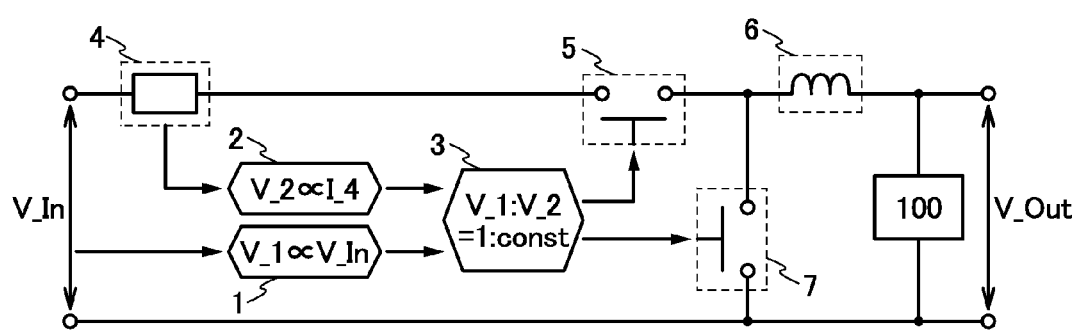
FIG. 5 illustrates an example of a DC-DC converter.

FIG. 5 illustrates an example of a DC-DC converter according to one embodiment of the present invention, which is different from the DC-DC converter illustrated in FIG. 2A. In short, the DC-DC converter illustrated in FIG. 5 has a configuration in which a charge and discharge unit 100 capable of being charged from a high-potential-side output node and discharged to the high-potential-side output node in accordance with an output voltage (V_Out) is added to the DC-DC converter illustrated in FIG. 2A.

In the DC-DC converter illustrated in FIG. 5, input impedance can be kept constant as in the case of the DC-DC converter illustrated in FIG. 2A. Further, in the DC-DC converter illustrated in FIG. 5, the charge and discharge unit 100 is charged and discharged from/to the high potential output node in accordance with the output voltage (V_Out). Here, in the DC-DC converter, charging is performed when the output voltage (V_Out) exceeds a charge inception voltage (V_c) and discharging is performed when the output voltage (V_Out) is lower than a discharge inception voltage (V_d). Note that the charge inception voltage (V_c) is set to higher than the discharge inception voltage (V_d) (V_c>V_d). Further, in the DC-DC converter, charging and discharging are not performed when the voltage of the output node is lower than or equal to the charge inception voltage (V_c) and higher than or equal to the discharge inception voltage (V_d). Thus, in the DC-DC converter illustrated in FIG. 5, the probability that the output voltage (a voltage of the output node) is kept in a specific range can be high.

⟨(1) Specific Example of Means 1 to 3⟩

In the DC-DC converter illustrated in FIG. 5, the circuit illustrated in FIG. 2B can be used as the means 1, the circuit illustrated in FIG. 2C can be used as the means 2, and the circuit illustrated in FIG. 2D can be used as the means 3.

⟨(2) Configuration Example of Charge and Discharge Unit 100⟩

Figure 6A:
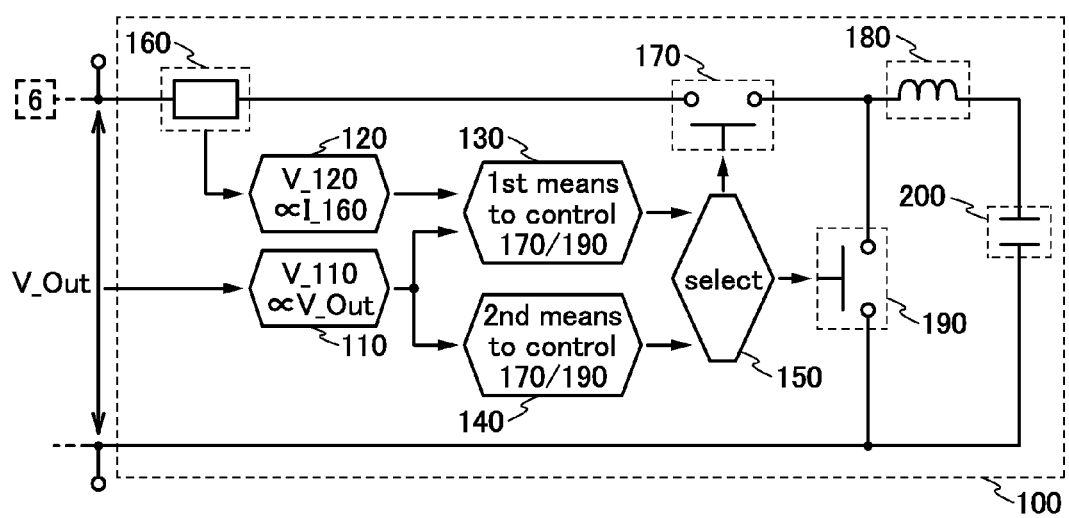
FIG. 6A illustrates a configuration example of a charge and discharge unit.

FIG. 6A illustrates a configuration example of the charge and discharge unit 100 illustrated in FIG. 5. The charge and discharge unit 100 illustrated in FIG. 6A includes a load 160 whose one end is electrically connected to a high-potential-side output node, a switch 170 whose one end is electrically connected to the other end of the load 160, an inductor 180 whose one end is electrically connected to the other end of the switch 170, a switch 190 whose one end is electrically connected to the other end of the switch 170 and the one end of the inductor 180 and whose the other end is grounded, and a capacitor 200 whose one electrode is electrically connected to the other end of the inductor 180 and the other electrode is grounded. Note that a resistance load, an inductive load, or the like can be used as the load 160. Further, a transistor, a relay, or the like can be used as the switches 170 and 190. Further, an air core coil, a core coil, or the like can be used as the inductor 180. Further, as the capacitor 200, an electric double layer capacitor or the like can be used.

Further, the charge and discharge unit 100 illustrated in FIG. 6A includes a means 110 which detects a voltage (V_110) proportional to the output voltage (V_Out), a means 120 which detects a voltage (V_120) proportional to a current (I_160) generated in the load 160, a means 130 which can control switching of the switches 170 and 190 in accordance with the voltage (V_110) and the voltage (V_120), a means 140 which can control the switching of the switches 170 and 190 in accordance with only the voltage (V_110), and a means 150 which selects how to control the switching of the switches 170 and 190.

The means 150 is a means which selects whether to control the switching of the switches 170 and 190 by the means 130 or 140 or to turn off the switches 170 and 190. Specifically, in the charge and discharge unit 100 illustrated in FIG. 6A, the means 150 selects the means 130 in the case where the capacitor 200 is charged, selects the means 140 in the case where the capacitor 200 is discharged to the high-potential-side output node, and turns off the switches 170 and 190 in the case where charging and discharging are not performed. That is, in the charge and discharge unit 100 illustrated in FIG. 6A, the switching of the switches 170 and 190 in the case where the capacitor 200 is charged is controlled by the current (I_160) generated in the load 160 and the output voltage (V_Out), and the switching of the switches 170 and 190 in the case where the capacitor 200 is discharged to the high-potential-side output node is controlled only by the output voltage (V_Out).

Figure 6B:
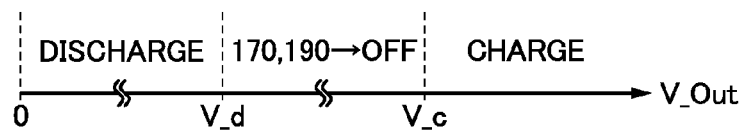
FIG. 6B illustrates operation of the charge and discharge unit.

The means 130 and the means 140 illustrated in FIG. 6A are both controlled by the output voltage (V_Out). Thus, in the charge and discharge unit 100 illustrated in FIG. 6A, operation can be performed as illustrated in FIG. 6B. Specifically, in the charge and discharge unit 100 in FIG. 6A, it is possible to perform charging when the output voltage (V_Out) is higher than the charge inception voltage (V_c) and perform discharging when the output voltage (V_Out) is lower than the discharge inception voltage (V_d). Further, in the charge and discharge unit 100 in FIG. 6A, it is possible not to perform charging and discharging (the switches 170 and 190 are made off by the means 150) when the output voltage (V_Out) is higher than or equal to the discharge inception voltage (V_d) and lower than the charge inception voltage (V_c).

〈 (a) Specific Example of Means 110〉

Figure 7A:
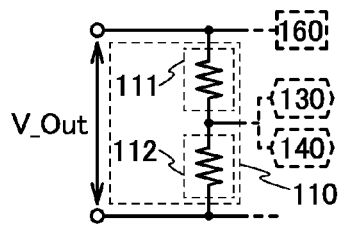
FIG. 7A illustrates a specific example of a means 110.

As the means 110, the circuit illustrated in FIG. 7A can be used. The circuit illustrated in FIG. 7A includes a resistor 111 whose one end is electrically connected to a high-potential-side output node and a resistor 112 whose one end is electrically connected to the other end of the resistor 111 and whose the other end is grounded. The potential of a node where the other end of the resistor 111 and the one end of the resistor 112 are electrically connected to each other is output to the means 130 and the means 140. That is, the circuit illustrated in FIG. 7A detects the voltage (V_110) proportional to the output voltage (V_Out) utilizing resistance voltage division and outputs the voltage (V_110) to the means 130 and 140.

〈 (b) Specific Example of Means 120〉

Figure 7B:
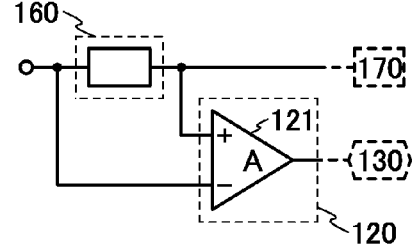
FIG. 7B illustrates a specific example of a means 120.

As the means 120, the circuit illustrated in FIG. 7B can be used. The circuit illustrated in FIG. 7B includes an instrumentation amplifier 121 to which a voltage of the other end of the load 160 and a voltage of the one end of the load 160 are input as a non-inverting input signal and an inverting input signal, respectively. That is, in the circuit illustrated in FIG. 7B, the instrumentation amplifier 121 detects the voltage (V_120) proportional to the current (I_160) generated in the load 160 and outputs the voltage (V_120) to the means 130.

〈 (c) Specific Example of Means 130〉

Figure 7C:
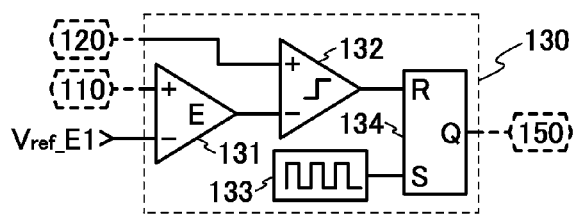
FIG. 7C illustrates a specific example of a means 130.

As the means 130, the circuit illustrated in FIG. 7C can be used. The circuit illustrated in FIG. 7C includes an error amplifier 131 to which the voltage (V_110) detected by the means 110 and a reference voltage (Vref_E1) are input as a non-inverting input signal and an inverting input signal, respectively, a comparator 132 to which the voltage (V_120) detected by the means 120 and a voltage output from the error amplifier 131 are input as a non-inverting input signal and an inverting input signal, respectively, a clock generator 133, and an RS type flip flop 134 in which a voltage output from the comparator 132 is input to an R terminal and a voltage output from the clock generator 133 (a clock signal) is input to an S terminal. When the circuit illustrated in FIG. 7C controls the switching of the switches 170 and 190, the switching of the switches 170 and 190 are controlled in accordance with a voltage output from a Q terminal of the RS type flip flop 134.

〈 (d) Specific Example of Means 140〉

Figure 7D:
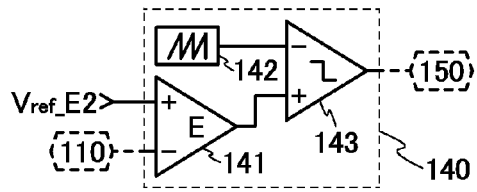
FIG. 7D illustrates a specific example of a means 140.

As the means 140, the circuit illustrated in FIG. 7D can be used. The circuit illustrated in FIG. 7D includes an error amplifier 141 to which a reference voltage (Vref_E2) and the voltage (V_110) detected by the means 110 are input as a non-inverting input signal and an inverting input signal, respectively, a triangle wave oscillator 142, and a comparator 143 to which a voltage output from the error amplifier 141 and a voltage (triangle wave) output from the triangle wave oscillator 142 are input as a non-inverting input signal and an inverting input signal, respectively. When the circuit illustrated in FIG. 7D controls the switching of the switches 170 and 190, the switching of the switches 170 and 190 are controlled in accordance with a voltage output from the comparator 143.

〈 (e) Specific Example of Means 150〉

Figure 7E:
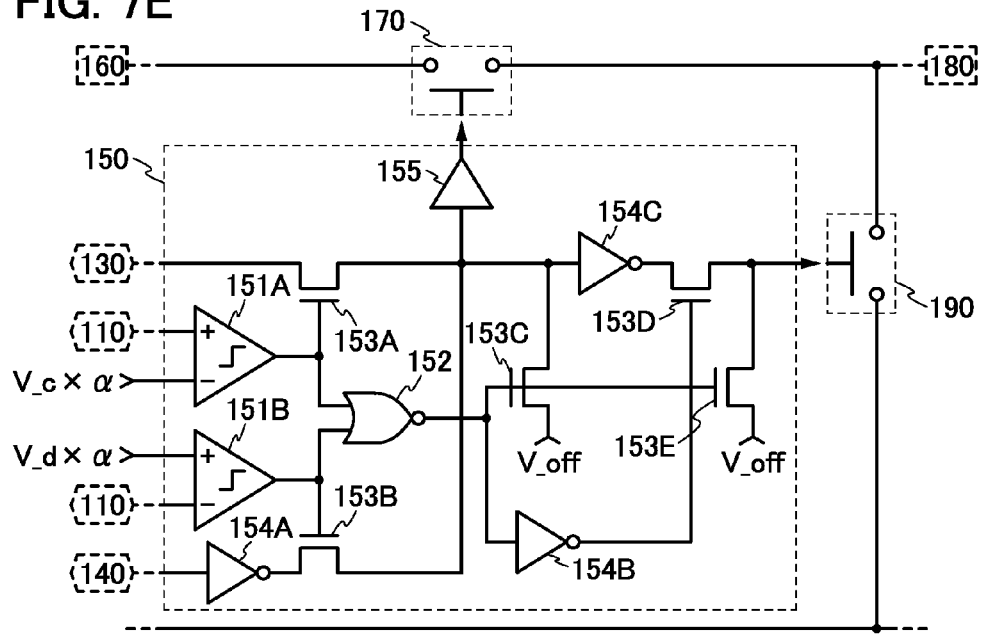
FIG. 7E illustrates a specific example of a means 150.

As the means 150, the circuit illustrated in FIG. 7E can be used. The circuit illustrated in FIG. 7E includes comparators 151A and 151B, a NOR gate 152, transistors 153A, 153B, 153C, 154D, and 154E, inverters 154A, 154B, and 154C, and a buffer 155.

The voltage (V_110) detected by the means 110 and a voltage (V_c×α) are input to the comparator 151A as a non-inverting input signal and an inverting input signal, respectively. Further, a voltage (V_d×α) and the voltage (V_110) detected by the means 110 are input to the comparator 151B as a non-inverting input signal and an inverting input signal, respectively.

A voltage output from the comparator 151A and a voltage output from the comparator 151B are input to the NOR gate 152 as a first input signal and a second input signal, respectively.

A voltage output from the comparator 151A is input to a gate of the transistor 153A and a voltage (V_130) output from the means 130 to control the switching of the switches 170 and 190 is input to either a source or a drain of the transistor 153A. A voltage output from the comparator 151B is input to a gate of the transistor 153B. A voltage output from the NOR gate 152 is input to a gate of the transistor 153C and a voltage (V_off) for making the switches 170 and 190 off is input to either a source or a drain of the transistor 153C. A voltage output from the NOR gate 152 is input to a gate of the transistor 153E and the voltage (V_off) is input to either a source or a drain of the transistor 153E. Note that in the means 150 illustrated in FIG. 7E, the switching of the switch 190 is controlled by a voltage output through the source and drain of the transistor 153D or the source and drain of the transistor 153E.

A voltage (V_140) output from the means 140 in order to control the switching of the switches 170 and 190 is input to the inverter 154A, and a voltage that has a phase opposite to that of the voltage input to the inverter 154A is output to either a source or a drain of the transistor 153B. Further, a voltage output from the NOR gate 152 is input to the inverter 154B, and a voltage that has a phase opposite to that of the voltage input to the inverter 154B is output to a gate of the transistor 153D. Further, a voltage is input to the inverter 154C through the source and drain of the transistor 153A, the source and drain of the transistor 153B, or the source and drain of the transistor 153C, and a voltage that has a phase opposite to that of the voltage input to the inverter 154C is output to either the source or drain of the transistor 153D.

The switching of the switch 170 is controlled by inputting the voltage (V_130), (V_140) or (V_off) to the buffer 155, and outputting a voltage that has the same phase as the voltage input to the buffer 155. However, the buffer 155 may be omitted from the means 150 illustrated in FIG. 7E.

Note that the voltage (V_c×α) input to the comparator 151A as an inverting input signal is a voltage which is detected by the means 110 when the output voltage (V_Out) is equal to the charge inception voltage (V_c), and the voltage (V_d×α) input to the comparator 151B as a non-inverting input signal is a voltage which is detected by the means 110 when the output voltage (V_Out) is equal to the discharge inception voltage (V_d).

Thus, in the means 150 illustrated in FIG. 7E, the transistors 153A and 153D are turned on and the transistors 153B, 153C, and 153E are turned off when the output voltage (V_Out) is higher than the charge inception voltage (V_c). In that case, the switching of the switches 170 and 190 is controlled by the voltage (V_130) output from the means 130 in order to control the switching of the switches 170 and 190. Further, the transistors 153B and 153D are turned on and the transistors 153A, 153C, and 153E are turned off when the output voltage (V_Out) is lower than the discharge inception voltage (V_d). In that case, the switching of the switches 170 and 190 is controlled by the voltage (V_140) output from the means 140 in order to control the switching of the switches 170 and 190. Furthermore, the transistors 153C and 153E are turned on and the transistors 153A, 153B, and 153D are turned off when the output voltage (V_Out) is higher than or equal to the discharge inception voltage (V_d) and lower than the charge inception voltage (V_c). In that case, the switches 170 and 190 are turned off.

⟨ 2-2. Modification Example of DC-DC Converter⟩

A DC-DC converter according to one embodiment of the present invention includes a DC-DC converter having a different configuration from that in FIG. 5. For example, as in the case of the DC-DC converter illustrated in FIG. 3A, the switch 7 included in the DC-DC converter in FIG. 5 may be replaced with a diode. Alternatively, as in the case of the DC-DC converter illustrated in FIG. 3C, a configuration in which two diodes are added to the DC-DC converter illustrated in FIG. 5 can be employed. Further alternatively, a configuration of the charge and discharge unit 100 included in the DC-DC converter illustrated in FIG. 5 can be changed as appropriate. A modification example of the charge and discharge unit 100 is described below.

⟨ (1) Modification Example 1 of Charge and Discharge Unit 100⟩

Figure 8A:
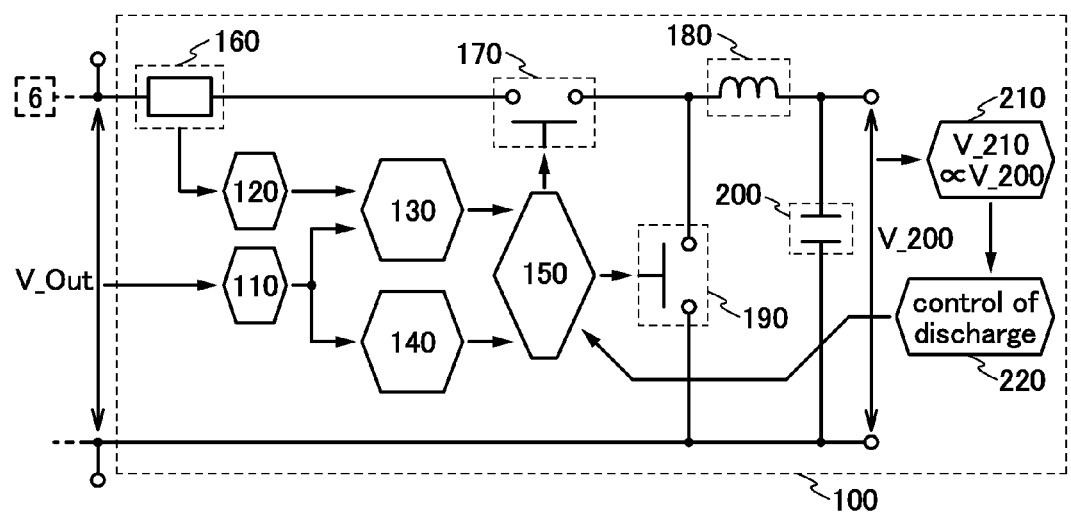
FIG. 8A illustrates a modification example of the charge and discharge unit and FIG. 8B illustrates operation of the charge and discharge unit.

FIG. 8A illustrate an example of the charge and discharge unit 100 that is different from that in FIG. 6A. In short, the charge and discharge unit 100 in FIG. 8A has a configuration in which a means 210 which detects a voltage (V_210) proportional to a charging voltage (V_200) that is a voltage between a pair of electrodes of the capacitor 200, and a means 220 which stops discharging of the charge and discharge unit 100 when the voltage (V_210) detected by the means 210 is lower than an overdischarge control voltage (V_ctrl_d) are added to the charge and discharge unit 100 in FIG. 6A. Note that the overdischarge control voltage (V_ctrl_d) is a voltage that is detected by the means 210 when the charge voltage (V_200) is equal to an overdischarge voltage.

Figure 8B:
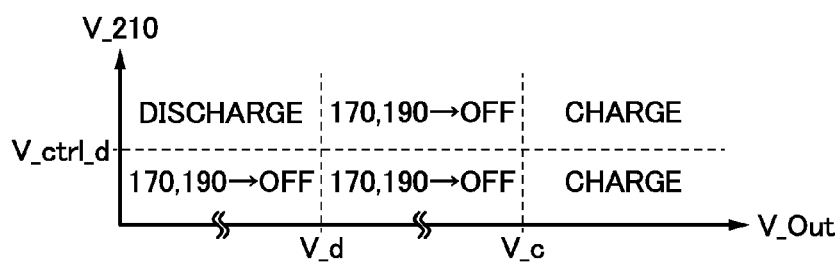

Specifically, in the charge and discharge unit 100 illustrated in FIG. 8A, operation can be performed as illustrated in FIG. 8B. In particular, in the charge and discharge unit 100 illustrated in FIG. 8A, it is possible to perform charging when the output voltage (V_Out) is higher than or equal to the charge inception voltage (V_c). Further, in the charge and discharge unit 100 illustrated in FIG. 8A, it is possible to perform discharging when the output voltage (V_Out) is lower than the discharge inception voltage (V_d) and the voltage (V_210) is higher than or equal to the overdischarge control voltage (V_ctrl_d), and it is possible not to perform charging and discharging (the switches 170 and 190 are made off by the means 150) when the output voltage (V_Out) is lower than the discharge inception voltage (V_d) and the voltage (V_210) is lower than the overdischarge control voltage (V_ctrl_d). Furthermore, in the charge and discharge unit 100 illustrated in FIG. 8A, it is possible not to perform the charging and the discharging (the switches 170 and 190 are made off by the means 150) when the output voltage (V_Out) is higher than or equal to the discharge inception voltage (V_d) and lower than the charge inception voltage (V_c).

The charge and discharge unit 100 illustrated in FIG. 8A is operated as illustrated in FIG. 8B, so that a drop in the output voltage (V_Out) due to the existence of the charge and discharge unit 100 can be suppressed. Specifically, whether the charge and discharge unit 100 is charged or discharged when the switch 170 is turned on depends on relative magnitude relation between the output voltage (V_Out) and the discharge voltage (V_200). Thus, when the switch 170 is turned on in the case where the output voltage (V_Out) and the discharge voltage (V_200) are both low, the output voltage (V_Out) might be further lowered. In the charge and discharge unit 100 illustrated in FIG. 8A, a drop in the output voltage (V_Out) in such a situation can be suppressed.

⟨ (a) Specific Example of Means 210⟩

As the means 210, the circuit illustrated in FIG. 9A can be used. The circuit illustrated in FIG. 9A includes a resistor 211 whose one end is electrically connected to one electrode of the capacitor 200, and a resistor 212 whose one end is electrically connected to the other end of the resistor 211 and whose the other end is grounded. Further, the potential of a node where the other end of the resistor 211 and the one end of the resistor 212 are electrically connected to each other is input to the means 220. That is, the circuit illustrated in FIG. 9A detects the voltage (V_210) proportional to the charging voltage (V_200) utilizing resistance voltage division and outputs the voltage (V_210) to the means 220.

⟨ (b) Specific Example of Means 220⟩

As the means 220, the circuit illustrated in FIG. 9B can be used. The circuit illustrated in FIG. 9B includes a comparator 221 to which the voltage (V_210) detected by the means 210 and the overdischarge control voltage (V_ctrl_d) are input as a non-inverting input signal and an inverting input signal, respectively. A binary voltage output from the comparator 221 is an output from the means 220 to the means 150. Thus, the means 220 outputs a high voltage to the means 150 when the charge voltage (V_200) exceeds the overdischarge voltage and outputs a low voltage to the means 150 when the charge voltage (V_200) is lower than the overdischarge voltage.

(c) Specific Example of Means 110, 120, 130, and 140)

In the charge and discharge unit 100 illustrated in FIG. 8A, the circuit illustrated in FIG. 7A can be used as the means 110. As the means 120, 130, and 140, the circuits illustrated in FIGS. 7B, 7C, and 7D can be used, respectively.

(d) Specific Example of Means 150)

In the charge and discharge unit 100 illustrated in FIG. 8A, the circuit illustrated in FIG. 9C can be used as the means 150. The circuit illustrated in FIG. 9C includes a comparators 151C and 151D, transistors 153F and 153G, inverters 154D and 154E, AND gates 156A, 156B, and 156C, a NAND gate 157, and an operation selection circuit 250. Note that the operation selection circuit 250 is a circuit which selects whether to control the switching of the switches 170 and 190 in accordance with a voltage output from the means 130 or 140 or to turn off the switches 170 and 190. Specifically, the operation selection circuit 250 is a circuit which outputs a binary voltage, outputs a high voltage when the switching of the switches 170 and 190 are controlled by the voltage output from the means 130 or 140, and outputs a low voltage when the switches 170 and 190 are turned off.

The voltage (V_110) detected by the means 110 and a voltage (V_c×α) are input to the comparator 151C as a non-inverting input signal and an inverting input signal, respectively. Further, the voltage (V_110) detected by the means 110 and the voltage (V_d×α) are input to the comparator 151D as a non-inverting input signal and an inverting input signal, respectively.

A voltage output from the comparator 151D is input to a gate of the transistor 153F.

A voltage output from the comparator 151D is input to the inverter 154D, and a voltage that has a phase opposite to that of the voltage input to the inverter 154D is output to a gate of the transistor 153G A voltage is input to the inverter 154E through a source and drain of the transistor 153F or a source and drain of the transistor 153G, and a voltage that has a phase opposite that of the voltage input to the inverter 154E is output.

A voltage output from the comparator 151C, and the voltage (V_130) output from the means 130 in order to control the switching of the switches 170 and 190 are input to the AND gate 156A as a first input signal and a second input signal, respectively, and an AND is output from the AND gate 156A to one of the source and drain of the transistor 153F. A voltage output from the operation selection circuit 250 and a voltage output through the source and drain of the transistor 153F or the source and drain of the transistor 153G are input to the AND gate 156B as a first input signal and a second input signal, respectively, and an AND is output from the AND gate 156B; thus, the switching of the switch 170 is controlled. A voltage output from the operation selection circuit 250 and a voltage output from the inverter 154E are input to the AND gate 156C as a first input signal and a second input signal, respectively, and AND is output from the AND gate 156C; thus, the switching of the switch 190 is controlled.

Note that a configuration in which a buffer is provided between the AND gate 156B and the switch 170 or between the AND gate 156C and the switch 190 may be employed. For example, in the case where a large amount of current is necessary for the switching of the switches 170 and 190, the buffer is preferably provided.

A voltage (V_220) that is output from the means 220 in order to control the operation of the means 150, and a voltage (V_140) that is output from the means 140 in order to control the switching of the switches 170 and 190 are input to the NAND gate 157 as a first input signal and a second input signal, respectively; and a NAND is output from the NAND gate 157 to one of the source and drain of the transistor 153G.

A voltage (V_151C) that is output from the comparator 151C, a voltage (V_151D) that is output from the comparator 151D, and the voltage (V_220) that is output from the means 220 in order to control the operation of the means 150 are input to the operation selection circuit 250. The operation selection circuit 250 outputs a specific voltage (V_250) to the AND gates 156B and 156C in accordance with the input voltages.

Specifically, the operation selection circuit 250 outputs a voltage shown in FIG. 9D to the AND gates 156B and 156C in accordance with the voltage (V_151C), the voltage (V_151D), and the voltage (V_220). Note that the voltage (V_151C), the voltage (V_151D), and the voltage (V_220) each are a binary voltage. The term "H" in FIG. 9D shows that the voltage is high, and the term "L" shows that the voltage is low. Further, "1-1" to "1-3" and "2-1" to "2-3" in FIG. 9D correspond to numeric values in FIG. 9E. Note that FIG. 9E shows the same value range as that in FIG. 8B. That is, FIG. 9D shows each of the voltages (V_151C), (V_151D), (V_220), and (V_250) when the voltage (V_210) and the output voltage (V_Out) have specific value ranges. For example, when the voltage (V_210) is higher than or equal to the overdischarge control voltage (V_ctrl_d) and the output voltage (V_Out) is higher than or equal to the discharge inception voltage (V_d) and lower than the charge inception voltage (V_c) (that is, the case of "2-2" shown in FIGS. 9D and 9E), the voltage (V_151C) becomes a low voltage (L); the voltage V_151D becomes a high voltage (H); and the voltage (V_220) becomes a high voltage (H). In that case, the operation selection circuit 250 outputs a low voltage (L) to the AND gates 156B and 156C.

As the operation selection circuit 250, any circuit which can perform logical operation illustrated in FIG. 9D may be used. For example, the circuit illustrated in FIG. 9F can be used as the operation selection circuit 250.

The circuit illustrated in FIG. 9F includes an inverter 251 to which the voltage (V_151C) output from the comparator 151C is input, an AND gate 252 to which a voltage output from the inverter 251 and a voltage (V_151D) output from the comparator 151D are input as a first input signal and a second input signal, respectively; a NOR gate 253 to which a voltage (V_151D) output from the comparator 151D and a voltage (V_220) output from the means 220 in order to control the operation of the means 150 are input as a first input and a second input, respectively; and a NOR gate 254 to which a voltage output from the AND gate 252 and a voltage output from the NOR gate 253 are input as a first input signal and a second input signal, respectively. Further, in the circuit illustrated in FIG. 9F, the voltage output from the NOR gate 254 is output to the AND gates 156B and 156C.

⟨(2) Modification Example 2 of Charge and Discharge Unit 100⟩

Figure 10A:
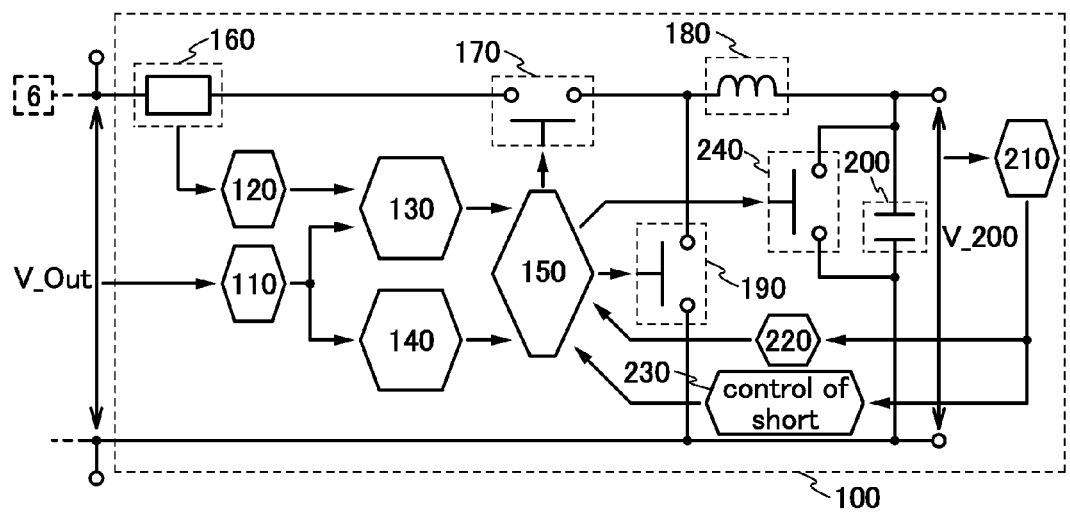
FIG. 10A illustrates a modification example of a charge and discharge unit and FIG. 10B illustrates operation of the charge and discharge unit.

FIG. 10A illustrates an example of the charge and discharge unit 100 having a configuration different from those in FIGS. 6A and 8A. In short, in the charge and discharge unit 100 illustrated in FIG. 10A, a means 230, and a switch 240 whose one end is electrically connected to the one electrode of the capacitor 200 and whose the other end is electrically connected to the other electrode of the capacitor are added to the charge and discharge unit 100 illustrated in FIG. 8A. Note that the means 230 is a means which can turn on the switch 240 (that is, a means which can cause a short circuit in the electrodes of the capacitor 200) when the voltage (V_210) detected by the means 210 is higher than or equal to the overcharge control voltage (V_ctrl_c) and the output voltage (V_Out) is higher than or equal to the discharge inception voltage (V_d). Note that the overcharge control voltage (V_ctrl_c) is a voltage that is detected by the means 210 when the charge voltage (V_200) is equal to the overcharge voltage. Further, in the charge and discharge unit 100 illustrated in FIG. 10A, the switch 240 is kept off when the voltage (V_210) is lower than the overdischrage control voltage (V_ctrl_c) or the output voltage (V_Out) is lower than the discharge inception voltage (V_d).

Figure 10B:
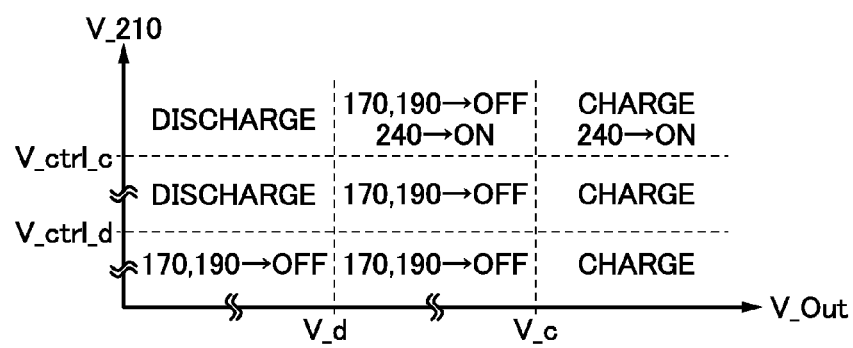

Specifically, the operation as illustrated in FIG. 10B can be performed in the charge and discharge unit 100 illustrated in FIG. 10A. As will be described in detail, in the charge and discharge unit 100 illustrated in FIG. 10A, it is possible to perform charging when the output voltage (V_Out) is higher than or equal to the charge inception voltage (V_c), and the switch 240 can be turned on when the voltage (V_210) is higher than or equal to the overcharge control voltage (V_ctrl_c). Further, in the charge and discharge unit 100 illustrated in FIG. 10A, it is possible to perform discharging when the output voltage (V_Out) is lower than the discharge inception voltage (V_d) and the voltage (V_210) is higher than or equal to the overdischarge control voltage (V_ctrl_d), and it is possible not to perform charging and discharging (the switches 170 and 190 are made off by the means 150) when the output voltage (V_Out) is lower than the discharge inception voltage (V_d) and the voltage (V_210) is lower than the overdischarge control voltage (V_ctrl_d). Furthermore, in the charge and discharge unit 100 illustrated in FIG. 10A, it is possible not to perform charging and discharging (the switches 170 and 190 are made off by the means 150) when the output voltage (V_Out) is higher than or equal to the discharge inception voltage (V_d) and lower than the charge inception voltage (V_c) and the switch 240 can be turned on when the voltage (V_210) is higher than or equal to the overcharge control voltage (V_ctrl_c).

The charge and discharge unit 100 illustrated in FIG. 10A is operated as illustrated in FIG. 10B, whereby a breakdown of the capacitor 200 can be suppressed. Specifically, the switch 240 is turned off when the charge voltage (V_200) is high, so that a further increase in the charge voltage (V_200) is suppressed. Thus, a breakdown of the capacitor 200 can be suppressed.

⟨ (a) Specific Example of Means 230⟩

As the means 230, the circuit illustrated in FIG. 11A can be used. The circuit illustrated in FIG. 11A includes a comparator 231 to which the voltage (V_210) detected by the means 210 and the overcharge control voltage (V_ctrl_c) are input as a non-inverting input signal and an inverting input signal, respectively. A binary voltage output from the comparator 231 is an output from the means 220 to the means 150. Thus, the means 230 outputs a high voltage and a low voltage when the charge voltage (V_200) exceeds the overcharge voltage and when the charge voltage (V_200) is lower than the overcharge voltage, respectively, to the means 150

⟨ (b) Specific Example of Means 110, 120, 130, 140, 210, and 220⟩

In the charge and discharge unit 100 illustrated in FIG. 10A, the circuits illustrated in FIGS. 7A to 7D, and FIGS. 9A, and 9B can be used as the means 110, the means 120, the means 130, the means 140, the means 210, and the means 220, respectively.

⟨ (c) Specific Example of Means 150⟩

In the charge and discharge unit 100 illustrated in FIG. 10A, the circuit illustrated in FIG. 11B can be used as the means 150. In short, the circuit illustrated in FIG. 11B has a configuration in which an AND gate 156D to which the voltage (V_151D) output from the comparator 151D and a voltage (V_230) output from the means 230 in order to control the operation of the means 150 are input as a first input signal and a second input signal, respectively, and which outputs an AND for controlling the switching of the switch 240 is added to the circuit in FIG. 9C.

⟨ Semiconductor Device⟩

Next, a semiconductor device including the above-described DC-DC converter is described with reference to FIGS. 12A and 12B. Note that in this specification, a semiconductor device refers to any device that operates by utilizing semiconductor properties.

⟨ 1. Configuration Example of Power Receiving Device⟩

Figure 12A:
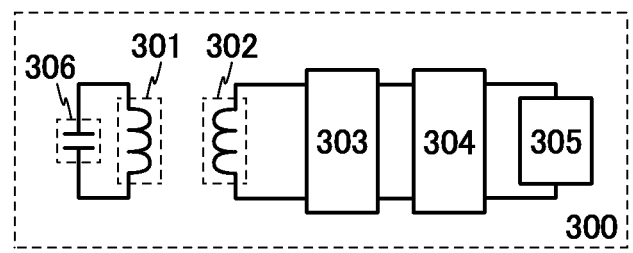
FIG. 12A illustrates a configuration example of a power receiving device and FIG. 12B illustrates a configuration example of a power feeding system.

FIG. 12A is a diagram illustrating a configuration example of a power receiving device in which power feeding is performed by a magnetic resonance method. A power receiving device 300 illustrated in FIG. 12A includes a resonance coil 301 in which a high-frequency voltage is induced by magnetic resonance, a coil 302 in which a high-frequency voltage is induced by electromagnetic induction with the resonance coil 301, a rectifier circuit 303 for rectifying the high-frequency voltage induced by the coil 302, a DC-DC converter 304 to which a direct-current voltage output from the rectifier circuit 303 is input, and a battery 305 in which power feeding is performed utilizing the direct-current voltage output from the DC-DC converter. Note that, in the resonance coil 301, stray capacitance 306 exists between wirings forming the resonance coil 301.

In the power receiving device illustrated in FIG. 12A, the above-described DC-DC converter is used as the DC-DC converter 304. Thus, the DC-DC converter 304 is capable of keeping input impedance constant. Further, the input impedance of the DC-DC converter 304 does not depend on the impedance of the battery 305 which exists on the output side. In other words, impedance conversion is performed by the DC-DC converter 304. Thus, the input impedance of the DC-DC converter 304 also serves as the input impedance of the power receiving device 300. Accordingly, input impedance of the power receiving device 300 does not vary even in the case where the impedance of the battery 305 varies in accordance with the charging state of the battery 305. As a result, power feeding with high power feeding efficiency is possible regardless of the charging state of the battery 305 in the power receiving device 300.

Note that as illustrated in FIG. 12A, it is preferable that the resonance coil 301 be not directly connected to another component. If another component is directly connected to the resonance coil 301, the series resistance and capacitance of the resonance coil 301 are increased. In this case, a Q value of a circuit including the resonance coil 301 and another component is lower than that of a circuit only including the resonance coil 301. This is because the configuration where the resonance coil 301 is directly connected to another component has lower power feeding efficiency than the configuration where the resonance coil 301 is not directly connected to another component.

⟨ 2. Configuration Example of Power Feeding System⟩

Figure 12B:
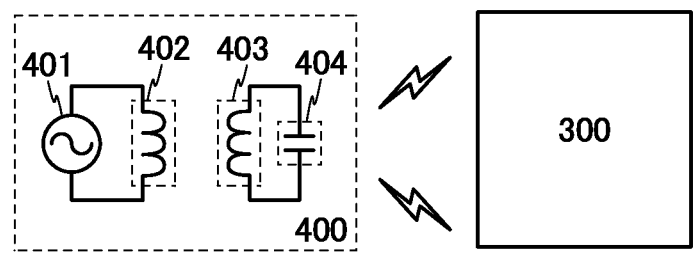

FIG. 12B illustrates a configuration example of a power feeding system where power feeding is performed by a magnetic resonance method. The power feeding system illustrated in FIG. 12B includes a power transmitting device 400 and a power receiving device 300 illustrated in FIG.

12A. Further, the power transmitting device 400 includes a high-frequency power supply 401, a coil 402 to which a high-frequency voltage generated by the high frequency power supply 401 is applied, and a resonance coil 403 in which a high-frequency voltage is induced by electromagnetic induction with the coil 402. Note that, in the resonance coil 403, stray capacitance 404 exists between wirings forming the resonance coil 403.

In the power feeding system illustrated in FIG. 12B, the power receiving device 300 illustrated in FIG. 12A is used as a power receiving device. Thus, in the power feeding system in FIG. 12B, power feeding can be performed regardless of variations in input impedance of the power receiving device. That is, in the power feeding system illustrated in FIG. 12B, power feeding with high power feeding efficiency can be performed without a dynamic change in the power feeding condition.

Note that as illustrated in FIG. 12B, it is preferable that the resonance coil 403 be not directly connected to other components.

EXAMPLE

In this example, applications of the above power feeding system are described. Note that as applications of a power feeding system according to one embodiment of the present invention, portable electronic devices such as a digital video camera, a portable information terminal (e.g., a mobile computer, a cellular phone, a portable game machine, or an e-book reader), and an image reproducing device including a recording medium (specifically a digital versatile disc (DVD) reproducing device) can be given. In addition, an electric propulsion moving vehicle that is powered by electric power, such as an electric car, can be given. Specific Examples are described below with reference to FIGS. 13A and 13B.

Figure 13A:
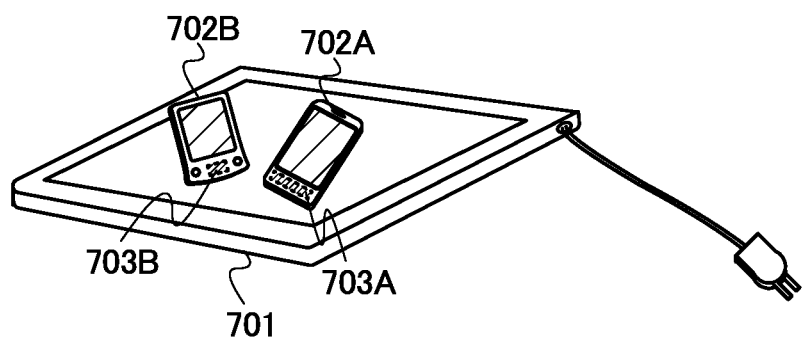
FIGS. 13A and 13B are application examples of power feeding systems.

FIG. 13A illustrates an application of a power feeding system to a cellular phone and a portable information terminal in which a power transmitting device 701, a cellular phone 702A including a power receiving device 703A, and a cellular phone 702B including a power receiving device 703B are included. The above power feeding system can be provided for the power transmitting device 701 and the power receiving devices 703A and 703B.

Figure 13B:
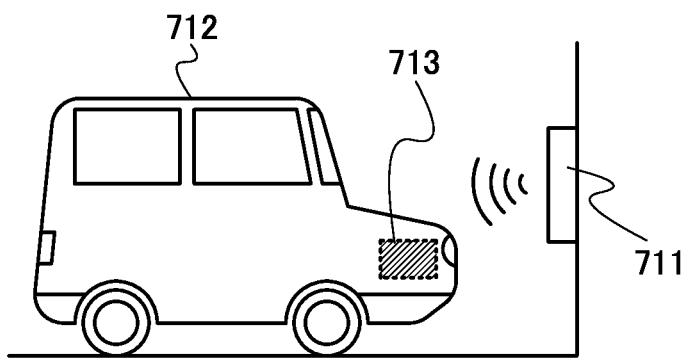

FIG. 13B illustrates an application of a power feeding system to an electric car that is an electric propulsion moving vehicle in which a power transmitting device 711 and an electric car 712 including a power receiving device 713 are included. The above power feeding system can be provided for the power transmitting device 711 and the power receiving device 713.

This application is based on Japanese Patent Application serial no. 2011-275190 filed with Japan Patent Office on Dec. 16, 2011 and Japanese Patent Application serial no. 2011-283740 filed with the Japan Patent Office on Dec. 26, 2011, the entire contents of which are hereby incorporated by reference.

What is claimed is:

1. A DC-DC converter comprising:
a load;
a first circuit comprising a first resistor;
a second circuit comprising an instrumentation amplifier;
a third circuit comprising an error amplifier; and
a first switch,
wherein one end of the load is electrically connected to one end of the first resistor and a first input terminal of the instrumentation amplifier,
wherein the other end of the load is electrically connected to a second input terminal of the instrumentation amplifier and one end of the first switch,
wherein the other end of the first resistor is electrically connected to a first input terminal of the error amplifier,
wherein the second circuit is electrically connected to a second input terminal of the error amplifier,
wherein the third circuit is electrically connected to the first switch,
wherein the one end of the first switch is provided between a first input node of the DC-DC converter and a first output node of the DC-DC converter,
wherein the first circuit is configured to output a first voltage proportional to an input voltage input to the DC-DC converter to the third circuit,
wherein the second circuit is configured to output a second voltage proportional to a current generated in the load to the third circuit, and
wherein the third circuit is configured to hold a ratio of the first voltage and the second voltage constant.

2. The DC-DC converter according to claim 1, further comprising a second resistor in the first circuit,
wherein the one end of the first resistor is electrically connected to the first input node of the DC-DC converter,
wherein the other end of the first resistor is electrically connected to one end of the second resistor, and
wherein the other end of the second resistor is electrically connected to a second input node of the DC-DC converter.

3. The DC-DC converter according to claim 1, further comprising a second switch,
wherein the other end of the first switch is electrically connected to one end of the second switch and the first output node of the DC-DC converter, and
wherein the other end of the second switch is electrically connected to a second output node of the DC-DC converter.

4. The DC-DC converter according to claim 1, further comprising a comparator in the third circuit,
wherein the comparator is electrically connected to the error amplifier.

5. The DC-DC converter according to claim 1, wherein the first switch is a transistor.

6. The DC-DC converter according to claim 1, further comprising a charge and discharge unit,
wherein the charge and discharge unit is provided between the first output node of the DC-DC converter and a second output node of the DC-DC converter.

7. A power receiving device comprising:
a first coil;
a rectifier circuit electrically connected to the first coil;
the DC-DC converter according to claim 1, the DC-DC converter being electrically connected to the rectifier circuit; and
a battery electrically connected to the DC-DC converter.

8. A power feeding system comprising:
a power transmitting device comprising:
a power supply; and
a second coil electrically connected to the power supply, and the power receiving device according to claim 7.

9. A DC-DC converter comprising:
a load;
a first circuit comprising a first resistor;
a second circuit comprising an instrumentation amplifier;
a third circuit comprising an error amplifier;

a first switch; and
a diode,
wherein one end of the load is electrically connected to one end of the first resistor and a first input terminal of the instrumentation amplifier,
wherein the other end of the load is electrically connected to a second input terminal of the instrumentation amplifier and one end of the first switch,
wherein the other end of the first resistor is electrically connected to a first input terminal of the error amplifier,
wherein one end of the diode is electrically connected to the other end of the first switch,
wherein the second circuit is electrically connected to a second input terminal of the error amplifier,
wherein the third circuit is electrically connected to the first switch,
wherein the one end of the first switch is provided between a first input node of the DC-DC converter and a first output node of the DC-DC converter,
wherein the first circuit is configured to output a first voltage proportional to an input voltage input to the DC-DC converter to the third circuit,
wherein the second circuit is configured to output a second voltage proportional to a current generated in the load to the third circuit, and
wherein the third circuit is configured to hold a ratio of the first voltage and the second voltage constant.

10. The DC-DC converter according to claim 9, further comprising a second resistor in the first circuit,
wherein the one end of the first resistor is electrically connected to the first input node of the DC-DC converter,
wherein the other end of the first resistor is electrically connected to one end of the second resistor, and
wherein the other end of the second resistor is electrically connected to a second input node of the DC-DC converter.

11. The DC-DC converter according to claim 9, further comprising a second switch,
wherein the other end of the first switch is electrically connected to one end of the second switch and the first output node of the DC-DC converter, and
wherein the other end of the second switch is electrically connected to a second output node of the DC-DC converter.

12. The DC-DC converter according to claim 9, further comprising a comparator in the third circuit,
wherein the comparator is electrically connected to the error amplifier.

13. The DC-DC converter according to claim 9, wherein the first switch is a transistor.

14. The DC-DC converter according to claim 9, further comprising a charge and discharge unit,
wherein the charge and discharge unit is provided between the first output node of the DC-DC converter and a second output node of the DC-DC converter.

15. A power receiving device comprising:
a first coil;
a rectifier circuit electrically connected to the first coil;
the DC-DC converter according to claim 9, the DC-DC converter being electrically connected to the rectifier circuit; and
a battery electrically connected to the DC-DC converter.

16. A power feeding system comprising:
a power transmitting device comprising:
a power supply; and
a second coil electrically connected to the power supply, and
the power receiving device according to claim 15.

* * * * *